No. 833,478. PATENTED OCT. 16, 1906.
F. J. NEWMAN.
POWER TRANSMISSION MECHANISM FOR AUTOMOBILES.
APPLICATION FILED JAN. 9, 1905.
3 SHEETS—SHEET 1.
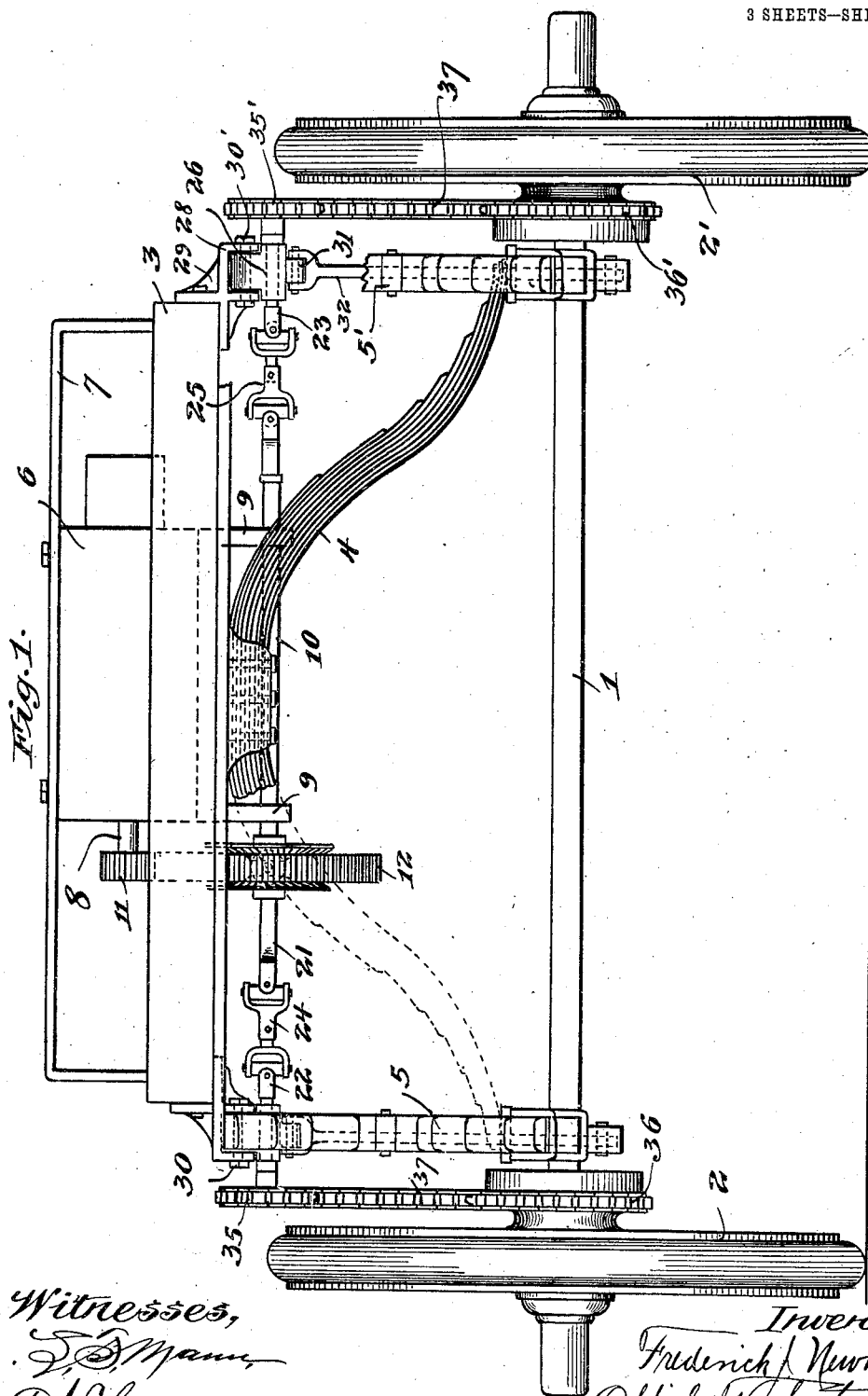

No. 833,478. PATENTED OCT. 16, 1906.
F. J. NEWMAN.
POWER TRANSMISSION MECHANISM FOR AUTOMOBILES.
APPLICATION FILED JAN. 9, 1905.
3 SHEETS—SHEET 2.
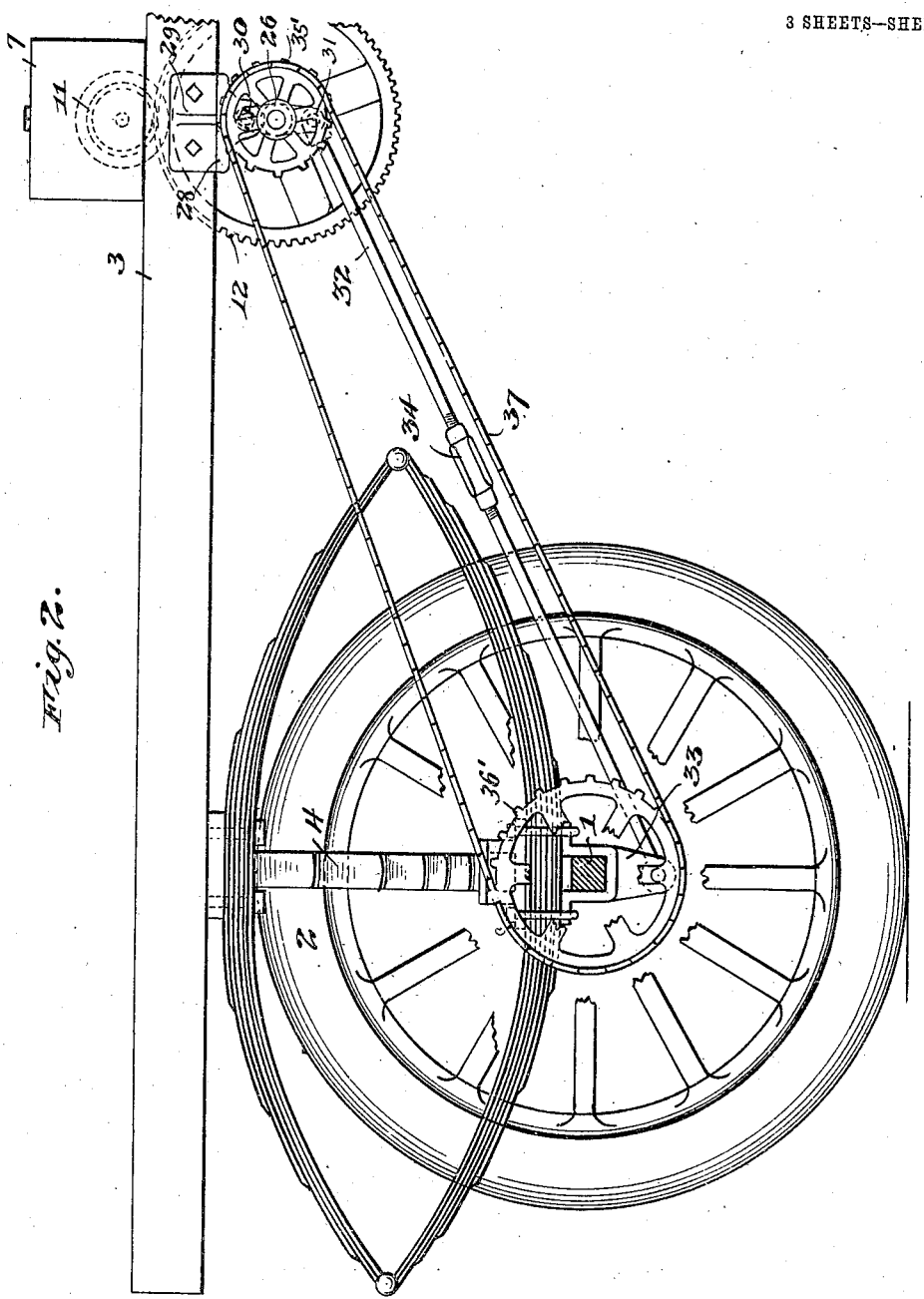

No. 833,478. PATENTED OCT. 16, 1906.
F. J. NEWMAN.
POWER TRANSMISSION MECHANISM FOR AUTOMOBILES.
APPLICATION FILED JAN. 9, 1905.
3 SHEETS—SHEET 3.
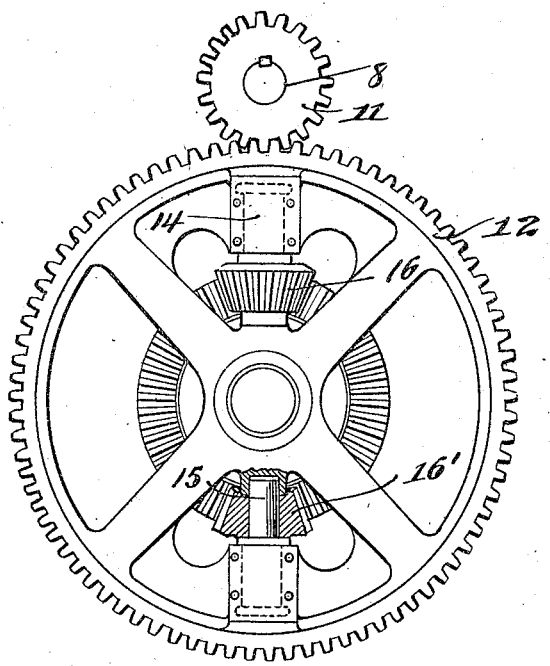
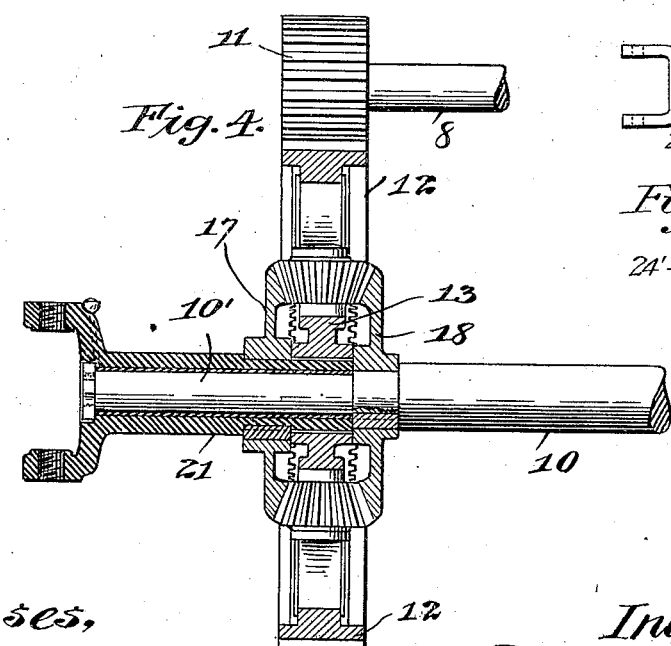
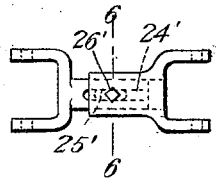
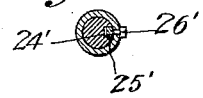

UNITED STATES PATENT OFFICE

FREDERICK J. NEWMAN, OF CHICAGO, ILLINOIS, ASSIGNOR TO WOODS MOTOR VEHICLE COMPANY, OF CHICAGO, ILLINOIS, A CORPORATION OF ILLINOIS.

POWER-TRANSMISSION MECHANISM FOR AUTOMOBILES.

No. 833,478.      Specification of Letters Patent.      Patented Oct. 16, 1906.

Application filed January 9, 1905. Serial No. 240,303.

*To all whom it may concern:*

Be it known that I, FREDERICK J. NEWMAN, a citizen of the United States, residing in Chicago, in the county of Cook and State of Illinois, have invented certain new and useful Improvements in Power-Transmission Mechanisms for Automobiles, of which the following is a specification.

This invention relates to improvements in power-transmission mechanisms for automobiles, and refers more specifically to improvement in the driving-trains connecting the driven wheels of a vehicle with the motor.

The salient object of the invention is to provide a construction and arrangement whereby the motor may be mounted upon a spring-supported vehicle-body and operatively connected with the traction-wheels in such manner that the vertical movement of the motor with the spring-supported vehicle-body does not result in disarranging or lowering the driving efficiency of the driving connections between the motor and driven member or members.

Subsidiary objects of the invention are to movably mount an intermediate element or elements of the driving-train in such manner that it or they will automatically adjust, so as to maintain that relation of all of the elements of the train which will secure the greatest efficiency regardless of the change in position of the motor relatively to the ultimately-driven member; to provide a construction and arrangement of parts which will avoid the bringing of torsional or cramping stresses upon any part of the driving-train; to provide a construction in which the freedom of movement of the spring-supported frame or body of the vehicle is unhampered by the driving-train; to provide a construction in which power is transmitted from the motor to a sectional counter-shaft forming an intermediate member of the driving-train, parts of which shaft are susceptible of bodily movement independently of the motor, while another part of the same shaft is fixed relatively to the motor, thereby making it possible to support different parts of the shaft and different parts of the spring-supported frame; to provide a construction which is capable of convenient and accurate adjustment both in primarily applying it to the vehicle and in subsequently adjusting to compensate for wear, change of belt length, &c.; to provide a construction which is equally available for driving two traction-wheels by independent trains or for driving an axle upon which both traction-wheels are mounted, and in general to provide a simple and improved construction of the character referred to.

To the above ends the invention consists in the matters hereinafter described, and more particularly pointed out in the appended claims.

The invention will be readily understood from the following description, reference being had to the accompanying drawings.

Figure 1 is a rear end elevation of a vehicle equipped with a preferred embodiment of the invention, certain parts being broken away to show more clearly other parts of the construction. Fig. 2 is a side elevation of the parts shown in Fig. 1, certain parts of this figure being also broken out and others shown in section to expose more clearly the essential features of construction. Figs. 3 and 4 show details of the driving mechanism. Fig. 5 is a plan view of a universal joint, and Fig. 6 is a cross-section on the line 6 6 of Fig. 5.

In that embodiment of the invention illustrated in said drawings the vehicle is of that type in which the two traction-wheels mounted on one axle are driven independently of each other, each being provided with its own train of driving connections.

Referring to the drawings, 1 designates the rear axle; 2 and 2', the traction-wheels; 3, the spring-supported body or body-frame of the vehicle, and 4, 5, and 5' leaf-springs whereby the body is yieldingly supported from the axle.

The specific construction and arrangement of the supporting-springs is, in a broader sense, immaterial; but it may be noted that the construction, arrangement, and connection of the vehicle-body, the set of springs, and the supporting-axle are such that the vehicle-body is confined to rise and fall in vertical planes or without longitudinal displacement relatively to the running-gear.

6 designates as a whole the motor, which in the present instance is shown as an electric motor rigidly supported upon a suitable frame 7, which is in turn rigidly connected with the body-frame of the vehicle. The motor is, as most usual, mounted forward of the main axle and intermediate of the length of the vehicle-body, with its main shaft 8 extending parallel with the rear axle of the vehicle. At each end the motor casing or frame is provided with depending lugs or arms 9, within which is journaled one section 10 of a counter-shaft arranged to extend parallel with the main shaft 8 of the motor and suitably driven from the latter by means of a transmission-train comprising a differential-gear mechanism constructed as follows:

Referring to Figs. 3 and 4, upon the motor-shaft 8 is mounted a spur-gear 11, which intermeshes with a larger gear 12. Gear 12 is of skeleton construction, its hub portion 13 being journaled upon an extension 21 of the counter-shaft 10, which extension is sleeved onto a reduced portion 10' of the shaft 10. At diametrically opposite points upon the gear 12 radial shafts 14 and 15 are supported in bearings carried by the rim and hubs, respectively, of the gear, and upon these shafts are fixed bevel-gears 16. The bevel-gears mesh at their peripheries with corresponding differential gears 17 and 18, fixedly mounted one upon the extension-shaft 21 and the other upon the main counter-shaft section 10. It will be understood that the gear 12 is loosely journaled upon the member 21, the construction thus forming a differential or equalizing drive between the motor-shaft and the counter-shaft members 10 and 21.

22 designates a counter-shaft section connected with the member 21 of the counter-shaft at one side of the machine, and 23 designates another counter-shaft section, connected with the end of the counter-shaft section 10, the members 21 and 22 being united with each other end to end by means of a universal joint 24 and the member 23 being similarly connected with the shaft-section 10 by means of a universal joint 25.

The universal joints 24 and 25 are, as shown, longitudinally extensible and contractible, having a telescopic engagement with each other, the inner member being provided with the keyway 24', in which a key 25' is adapted to slide, and secured to the outer member by the screw 26', which affords not only universal angular movement between the intermediate and end sections of the shaft, but relative longitudinal movement as well, this latter being essential to permit relative lateral bodily movement between the intermediate and end sections, such lateral bodily movement in turn being essential to preserve the perfect alinement of the driving and driven sprockets hereinafter mentioned.

The two members 22 and 23 of the section counter-shaft, which constitute the terminals of the latter, are respectively journaled in suspension-links 26, which are in turn pivotally supported at their upper ends between the ears 27 and 28 of brackets 29. The brackets 29 are bolted or otherwise rigidly mounted upon the body or body-frame 3 of the vehicle, it being understood that the pivot-bolts 30 of the suspension-links are arranged to extend accurately parallel with the journal-bearings which support the counter-shaft sections. Each suspension-link 26 is provided at its lower end with an extension-ear 31, with which is pivotally connected the forward end of a distance-bar 32, the other ends of these distance-bars being, respectively, connected pivotally with the rear axle at points as near as conveniently may be in alinement with a line extending between the axis of the axle and the axis of the counter-shaft. In practice and as shown herein the distance-rods are by means of the lugs 31, hereinbefore described, and similar lugs 33, formed upon clips carried by the main axle, positioned slightly below the theoretically-correct position above mentioned, but not sufficiently so to objectionably affect their function, which is to maintain the counter-shaft sections 22 and 23, respectively, at a uniform driving distance from the axes of the traction-wheels regardless of rising-and-falling movements of the motor with the vehicle-body. In order to adjust their lengths, each distance-rod is provided intermediate its length with a turnbuckle 34 of ordinary construction.

Upon the counter-shaft sections 22 and 23, respectively, are rigidly mounted sprocket-wheels 35 35', and in the same planes with these upon the hubs of the respective traction-wheels are mounted or formed sprockets 36 and 36'. The pairs of sprockets at each side of the vehicle are connected by means of suitable chain belts 37.

The operation of the mechanism constructed and arranged as described is probably obvious from the foregoing description, but may be briefly summarized as follows: Inasmuch as the motor is rigidly mounted upon the spring-supported vehicle-frame and the latter rises and falls in substantially vertical planes, it follows that that section of the counter-shaft which maintains fixed relation to the motor will during the descent of the latter approach the axes of the traction-wheels and recede therefrom as the motor rises. The end sections of the counter-shaft, however, are free to swing with their respective suspension-links, and the latter being maintained by the distance-rods at a uniform distance from the axes of the traction-wheels it follows that as the motor and vehicle-body rise and fall together the links will swing backwardly or forwardly, thus maintaining the exact proper driving relation between the driving and driven sprockets. The universal joints interposed in the counter-shaft of course provide for this movement of the end sections relatively to the fixed central sections. Obviously the lurching of one side of the box does not in any wise affect or disturb the driving relations of the other side, and since each driving-train is independent of the other and each distance-rod maintains the proper relations between the driving elements it follows that there is no possible movement of the vehicle-box which can disturb or bring cramping or torsional stresses upon either of the driving-trains, and as a consequence the motor best exerts its efficiency under all conditions. Moreover, if the construction of those parts by which the vehicle-body is spring-supported from the running-gear be such that there is more or less longitudinal give or movement of the box relatively to the running-gear the mechanism of the present invention will obviously compensate for such movement also within reasonable limits.

While I have herein shown and described a preferred embodiment of the invention, yet it will be obvious that the details of construction and arrangement may be modified without departing from the invention, and I do not, therefore, limit myself to these details except to the extent that they are made the subject of specific claims.

I claim as my invention—

1. A driving mechanism for automobiles comprising a vehicle running-gear including a main axle, a pair of traction-wheels upon said main axle, a spring-supported vehicle-body carried by said running-gear, a motor carried by said vehicle-body at a point longitudinally removed from said axle and intermediate the length of the latter, a driving-shaft mounted in bearings carried by the vehicle-body, arranged to extend substantially parallel with the axis of rotation of the traction-wheels and operatively connected with the motor, an extension driving-shaft section connected with each end of said driving-shaft by means of flexible longitudinally expansible and contractible driving connections, swinging links mounted at the respective sides of the vehicle-body and carrying journals through which said extension driving-shaft sections extend, distance-bars connecting the respective links with the running-gear at points approximately coincident with the axis of rotation of the traction-wheel, gears mounted respectively upon the respective traction-wheels, corresponding gears mounted upon the respective extension-shaft sections, and driving connections between each pair of gears.

2. A driving mechanism for automobiles comprising a vehicle running-gear including a main axle, a pair of traction-wheels upon said main axle, a spring-supported vehicle-body carried by said running-gear, a motor carried by said vehicle-body at a point longitudinally removed from said axle and intermediate the length of the latter, a driving-shaft mounted in bearings carried by the vehicle-body, arranged to extend substantially parallel with the axis of rotation of the traction-wheels and operatively connected with the motor, an extension driving-shaft section connected with each end of said driving-shaft by means of flexible longitudinally expansible and contractible driving connections, swinging links mounted at the respective sides of the vehicle-body and carrying journals through which said extension driving-shaft sections extend, distance-bars pivotally connecting the respective links with the running-gear at points approximately coincident with the axis of rotation of the traction-wheel, gears mounted respectively upon the respective traction-wheels, corresponding gears mounted upon the respective extension-shaft sections, and driving connections between each pair of gears, and a differential-gear mechanism interposed in said driving-shaft and forming one of the elements through which driving moment is imparted thereto from the motor.

FREDERICK J. NEWMAN.

Witnesses:
FREDERICK C. GOODWIN,
JAMES R. OFFIELD.